(12) United States Patent
Yuan et al.

(10) Patent No.: US 11,410,002 B2
(45) Date of Patent: Aug. 9, 2022

(54) SHIP IDENTITY RECOGNITION METHOD BASED ON FUSION OF AIS DATA AND VIDEO DATA

(71) Applicant: SHANGHAI ADVANCED AVIONICS CO., LTD., Shanghai (CN)

(72) Inventors: Min Yuan, Shanghai (CN); Shulin Peng, Shanghai (CN); Wei Qian, Shanghai (CN); Kanjun Ni, Shanghai (CN); Xinya Wang, Shanghai (CN)

(73) Assignee: SHANGHAI ADVANCED AVIONICS CO., LTD., Shanghai (CN)

( * ) Notice: Subject to any disclaimer, the term of this patent is extended or adjusted under 35 U.S.C. 154(b) by 88 days.

(21) Appl. No.: 17/097,057

(22) Filed: Nov. 13, 2020

(65) Prior Publication Data
US 2021/0073573 A1 Mar. 11, 2021

Related U.S. Application Data

(63) Continuation of application No. PCT/CN2019/078720, filed on Mar. 19, 2019.

(30) Foreign Application Priority Data

Nov. 15, 2018 (CN) .......................... 201811360912.4

(51) Int. Cl.
G06K 9/62 (2022.01)
G06T 7/00 (2017.01)
(Continued)

(52) U.S. Cl.
CPC ........... *G06K 9/629* (2013.01); *G06K 9/6255* (2013.01); *G06K 9/6288* (2013.01);
(Continued)

(58) Field of Classification Search
None
See application file for complete search history.

(56) References Cited

U.S. PATENT DOCUMENTS

| 8,411,969 B1 * | 4/2013 | Joslin | G06V 20/13 |
| | | | 382/103 |
| 2004/0165775 A1 * | 8/2004 | Simon | G06T 7/80 |
| | | | 382/181 |

(Continued)

FOREIGN PATENT DOCUMENTS

CN 106991687 A * 7/2017

OTHER PUBLICATIONS

Dembovskis A. Testbed for performance evaluation of SAT-AIS receivers. In2012 6th Advanced Satellite Multimedia Systems Conference (ASMS) and 12th Signal Processing for Space Communications Workshop (SPSC) Sep. 5, 2012 (pp. 253-257). IEEE. (Year: 2012).*

(Continued)

*Primary Examiner* — Emily C Terrell
*Assistant Examiner* — Nathan J Bloom
(74) *Attorney, Agent, or Firm* — RatnerPrestia

(57) ABSTRACT

Disclosed is a ship identity recognition method based on the fusion of AIS data and video data, comprising: collecting a ship sample to train a ship target classifier; performing, using the ship target classifier, ship target detection on a video frame collected by a gimbal camera; performing a comparison with a recognized ship library to filter a recognized ship; acquiring AIS data and filtering same across time and spatial scales; predicting the current position of an AIS target using a linear extrapolation method and converting the current position to an image coordinate system; performing position matching between a target to be matched and the converted AIS target; and performing feature extraction on the successfully matched target and storing the extracted (Continued)

feature, together with ship identity information, into the recognized ship library. Experimental results show that the present invention can quickly and accurately extract a surveillance video and perform identity recognition on the ship target, effectively reduces labor costs, and has a broad application prospect in the fields such as ship transportation and port management.

17 Claims, 3 Drawing Sheets

(51) Int. Cl.
  *G06V 10/44* (2022.01)
  *G06V 10/80* (2022.01)
  *G06V 10/75* (2022.01)
  *G06V 20/54* (2022.01)
  *G08G 3/02* (2006.01)
  *G08G 3/00* (2006.01)
(52) U.S. Cl.
  CPC .......... *G06K 9/6293* (2013.01); *G06T 7/0008* (2013.01); *G06V 10/44* (2022.01); *G06V 10/757* (2022.01); *G06V 10/80* (2022.01); *G06V 20/54* (2022.01); *G06T 2207/30248* (2013.01); *G06V 2201/07* (2022.01); *G08G 3/00* (2013.01); *G08G 3/02* (2013.01)

(56) References Cited

U.S. PATENT DOCUMENTS

2013/0014584 A1* 1/2013 Nakamura .............. G01S 3/781
                                                       73/504.09
2019/0391277 A1* 12/2019 Ernandes ................. G08G 3/00

OTHER PUBLICATIONS

Zhao Z, Ji K, Xing X, Zou H, Zhou S. Ship surveillance by integration of space-borne SAR and AIS—further research. The Journal of Navigation. Mar. 2014;67(2):295-309. (Year: 2014).*
R. Pelich, N. Longépé, G. Mercier,, "AIS-Based Evaluation of Target Detectors and SAR Sensors Characteristics for Maritime Surveillance," IEEE Journal Selected Topics Applied Earth Observations Remote Sensing, vol. 8 No. 8, pp. 3892-3901, Aug. 2015, doi : 10.1109/JSTARS.2014. (Year: 2015).*
Vijverberg K, de Leeuw F, Marchiori E, Heskes T. Object localization and path prediction using radar and other sources towards autonomous shipping. Radboud University. Aug. 23, 2018. (Year: 2018).*

* cited by examiner

SHIP IDENTITY RECOGNITION METHOD BASED ON FUSION OF AIS DATA AND VIDEO DATA

TECHNICAL FIELD

The present invention relates to an information processing method in the field of vessel traffic service system (VTS), in particular relates to a ship identity recognition method base on fusion of AIS data and video data.

BACKGROUND

Video monitoring has become an important means of information collection in ship traffic, port management and other fields due to its intuitive, timely, accurate and large amount of information.

The ship target extraction and identification method in surveillance video can effectively reduce the human cost and improve the intelligent degree of maritime management, which has high research and application value.

Patent document CN201210543644.6 discloses a feature-based rapid identification method for ships, which trains a decision tree classifier based on ship features through a manually labeled ship feature library, and then uses the classifier to detect images in the video. This method can quickly extract ship targets from the waterway, but it cannot effectively identify the ship's identity information.

The image-based ship identification method published in the patent document CN201710981682.2 detects the ship target in the video through an improved background subtraction method, and compares it with the collected AIS information to obtain the ship's identity information. This method realizes ship identity recognition to a certain extent, but a single motion detection method is easy to miss the detection of stationary or low-speed ship targets, and it is easy to misdetect other moving objects as ship targets. This method realizes image coordinates and geography by calibrating the camera model. The conversion of coordinates makes the pan tilt camera unable to rotate and zoom.

SUMMARY

The technical problem to be solved by the present invention is to provide a geographic information-based simulation test system for medium-high frequency communication channels ship identity recognition method based on the fusion of AIS data and video data, which can effectively identify the ship's identity, reduce the human cost and improve the intelligent degree of maritime management.

The technical solution provided by the invention to solve the above technical problem is to provide a geographic information-based simulation test system for medium-high frequency communication channels ship identity recognition method based on the fusion of AIS data and video data, comprising steps as follows: step 1: collecting a ship sample to train a ship target classifier; step 2: performing, using the ship target classifier, ship target detection on a video frame collected by a gimbal camera; step 3: performing a comparison with a recognized ship library to filter a recognized ship, if the target is new, continue with the next steps; step 4: acquiring AIS data and filtering same across time and spatial scales; step 5: predicting the current position of an AIS target using a linear extrapolation method; step 6: converting the current position to an image coordinate system; step 7: performing position matching between the new target in step 3 and the converted AIS target in step 4, and the fail matched new target waiting for the next matching process; step 8: performing feature extraction on the successfully matched target and storing the extracted feature, together with ship identity information, into the recognized ship library, as the filtering standard of step 3.

Preferably, the specific process of step 1 is as follows: in the monitoring scene, collecting a number of ship image samples with different types and attitudes and a number of image samples without ship as positive and negative samples respectively, and training the ship target classifier based on Haar feature by offline training.

Preferably, the specific process of step 2 is as follows: detecting the ship target from the video frames collected by the pan-tilt camera by the trained ship target classifier, extracting the center point of the bottom edge of the ship target as the position of the target to participate in the position matching in the following steps.

Preferably, the step 4 filters the received AIS target data as follows: in terms of time, AIS data that is not updated beyond the preset time is considered as invalid data; in the terms of space, AIS targets that are out of the preset range are considered as invalid data.

Preferably, the preset time is 3 minutes, the preset range is ±15° of the camera field of view.

Preferably, the specific process of step 5 is as follows: predicting the actual position $(x_1, y_1)$ at the current moment $t_0$ according to the received AIS data, the AIS target data including sailing speed V, sailing direction θ, position $(x_0, y_0)$, AIS data sending time $t_{-1}$, the prediction formula as follows:

$$x_1 = x_0 + \arcsin\left\{\frac{\sin\left(\frac{D}{R}\right) \times \sin\theta}{\arccos\left[\sin(y_0) \times \cos\left(\frac{D}{R}\right) + \cos(y_0) \times \sin\left(\frac{D}{R}\right) \times \cos\theta\right]}\right\}$$

$$y_1 = 90 - \arccos\left[\sin(y_0) \times \cos\left(\frac{D}{R}\right) + \cos(y_0) \times \sin\left(\frac{D}{R}\right) \times \cos\theta\right]$$

Wherein D is the sailing distance of AIS target from time $t_{-1}$ to time $t_0$, $D=V(t_0-t_{-1})$, R is the radius of the earth.

Preferably, wherein the step 6 including:

Step 6.1: calibrating the camera parameters, obtaining the angle between the zero azimuth angle and the horizontal plane, and the angle between the horizontal direction and the geographical true north of the pan-tilt camera, the specific method is as follows:

Selecting n reference points, n is a natural number, the geographical location of the $n^{th}$ reference point is expressed as $(x_n, y_n)$, the coordinates under the image coordinate system are $(u_n, v_n)$, and the origin of the coordinates of the pixel coordinate system in the image coordinate system are $(u_0, v_0)$, the calculation formulas of $\theta_H$ and $\theta_N$ are as follows:

$$\theta_N = \frac{\sum_{n=1}^{n}\left[A_n - \arctan\frac{w(v_n - v_0)}{f_0 V_Z} - V_P\right]}{n}$$

$$\theta_H = \frac{\sum_{n=1}^{n}\left[B_n - \arctan\frac{h(u_n - u_0)}{f_0 V_Z} - V_T\right]}{n}$$

Wherein $A_n$ is the azimuth angle between the $n^{th}$ reference point and the camera, and $B_n$ is the angle between the line between the $n^{th}$ reference point and the camera and the horizontal plane.

Step 6.2: transforming the location of the AIS target from geographic coordinates to camera image coordinates, and the transformed coordinates (u, v) are calculated as follows:

$$u = u_0 + \frac{f_0 V_Z \tan(A - V_P - \theta_N)}{w}$$

$$v = v_0 + \frac{f_0 V_Z \tan(B - V_T - \theta_H)}{h}$$

Wherein A is azimuth angle between AIS target and the camera, B is angle between connecting line of AIS target and the camera and horizontal plane, $(u_0, v_0)$ are coordinates of origin of pixel coordinate system in image coordinate system, $V_P, V_T, V_Z$ are current pan-tilt parameters, $f_0$ is basic focal length of the pan-tilt camera, w is unit pixel width and h is unit pixel height.

Preferably, wherein implementing step 4, step 5 and step 6 in the whole identification process, continuously receiving ship AIS data within the receiving scope and processing the received AIS data.

Preferably, wherein the specific process of step 7 is as follows: calculating the Euclidean distance D between the position of the ship to be matched and the transformed target position of AIS, the formula is as follows:

$$D = \sqrt{(u_1 - u)^2 + (v_1 - v)^2}$$

The position of the ship to be matched is $(u_1, v_1)$, and the transformed target position of AIS is (u, v); calculating the confidence level C of matching success, the formula is as follows:

$$C = \frac{T - D}{T} \times 100\%$$

Wherein D is the Euclidean distance between the ship to be matched and the transformed target position of AIS, T is the preset threshold; the matching rules are: when D is greater than the preset threshold T, the target matching is judged failure directly; when D is less than the preset threshold T, the AIS target with the maximum confidence C of matching success is selected as the successful matching target.

Preferably, wherein the specific process of step 3 and step 8 are as follows: extracting the texture, contour, color and position features of the matched ship target to construct the target template, storing in the identified ship database together with the matching information; when a new target is generated, firstly comparing it with the identified ship database, if it is a recognized ship, it will be filtered, performing the matching process only when the ship is confirmed as new.

Compared with the prior art, the beneficial effects of the present invention are as follows: the geographic information-based simulation test system for medium-high frequency communication channels ship identity recognition method based on the fusion of AIS data and video data provided by the present invention can integrate AIS and video data through technical means such as image processing and information processing, and quickly and accurately extract and recognize ship targets in surveillance videos, which can effectively reduce human costs and has broad application prospects in ship transportation, port management and other fields.

DETAILED DESCRIPTION

The invention will now be further described below with reference to the accompanying drawings and examples.

Figure 1:
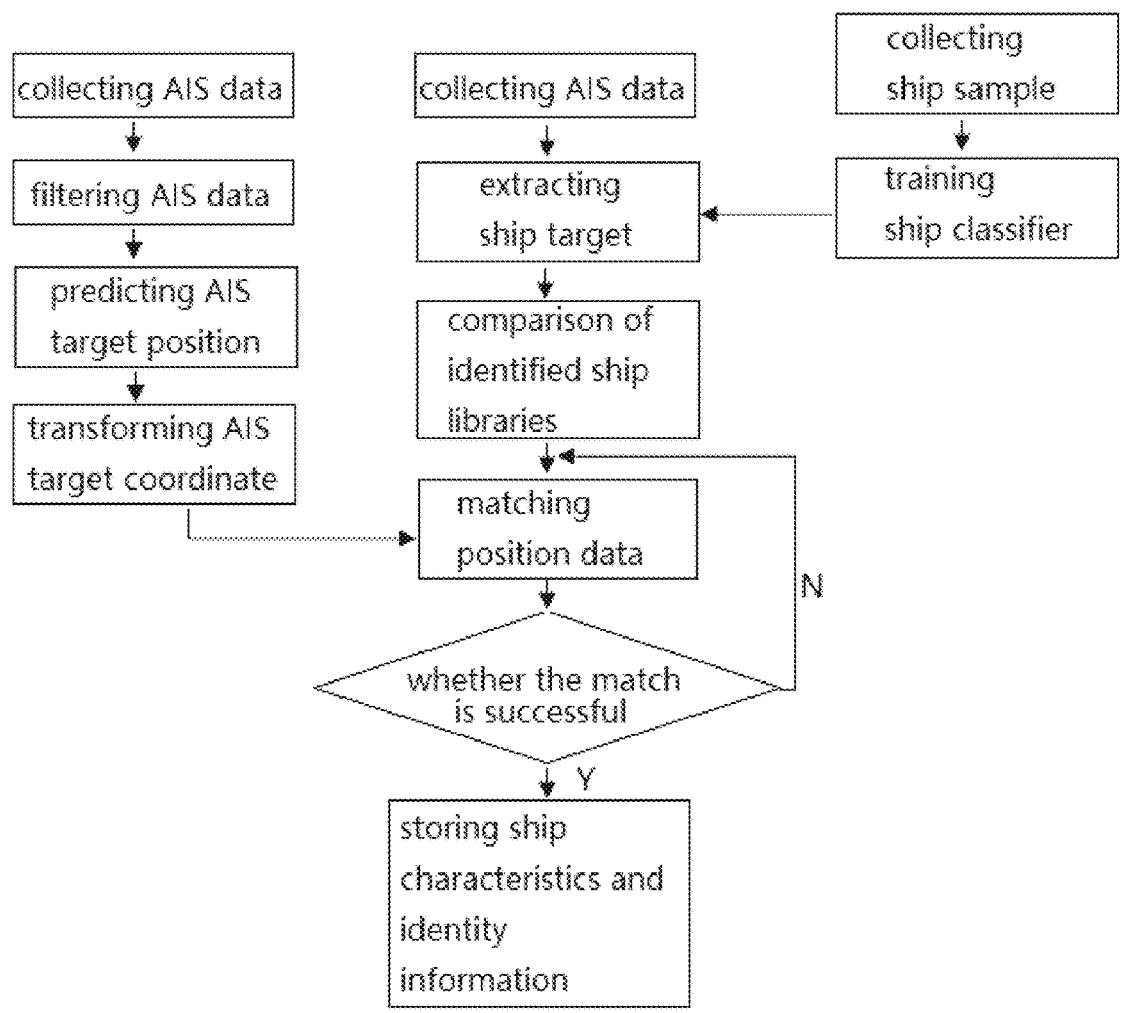
FIG. 1 is a flow chart of a geographic information-based simulation test system for medium-high frequency communication channels ship identity recognition method based on the fusion of AIS data and video data according to the present invention.

FIG. 1 is a flow chart of a geographic information-based simulation test system for medium-high frequency communication channels ship identity recognition method based on the fusion of AIS data and video data according to the present invention.

Please refer to FIG. 1, the geographic information-based simulation test system for medium-high frequency communication channels ship identity recognition method based on the fusion of AIS data and video data comprising:

Step 1: collecting a ship sample to train a ship target classifier;

Step 2: performing, using the ship target classifier, ship target detection on a video frame collected by a gimbal camera;

Step 3: performing a comparison with a recognized ship library to filter a recognized ship, if the target is new, continue with the next steps;

Step 4: acquiring AIS data and filtering same across time and spatial scales;

Step 5: predicting the current position of an AIS target using a linear extrapolation method;

Step 6: converting the current position to an image coordinate system;

Step 7: performing position matching between the new target in step 3 and the converted AIS target in step 4, and the fail matched new target waiting for the next matching process;

Step 8: performing feature extraction on the successfully matched target and storing the extracted feature, together with ship identity information, into the recognized ship library, as the filtering standard of step 3.

The step 1 is offline training and the number of ship samples participating in the training is an important factor influencing the detection rate of the ship target classifier.

In the step 2 the video acquisition sensor is a high-definition pan tilt camera; the center point of the lower edge of the ship target is extracted to represent the ship's position.

The step 3 compares the contour, color, texture, location and other characteristics of the detected ship target with the identified ship library, filters the identified ships, and executes the identification process only on the new target to improve the operating efficiency of the system.

The steps 4 and 5 do not indicate the order of execution. In fact, the steps 4 and 5 are executed during the entire identification process, and the ship AIS data within the range is continuously received.

The step 7 realizes the conversion between the geographic coordinate system and the image coordinate system according to the real-time parameters and installation parameters of the pan tilt, allowing movement of the pan tilt and zooming of the field of view.

In the step 8, the characteristics of the ship target are extracted including contour, color, texture, and position, and the identity information includes mmsi, ship name, type, size, and so on.

The invention includes four parts: ship target detection, AIS target data filtering and position estimation, target position matching, and construction of the identified ship library; the four parts are described in detail as follows.

1. Ship Target Detection

In the monitoring scene, collecting 2,000 picture samples of ships of different types and postures and 6,000 picture samples that do not contain ships as positive and negative samples, and scale the samples to 20×20 to train a ship target classifier based on Haar features, And then use the trained ship target classifier to detect the ship target on the video frame collected by the pan tilt camera, and extract the center point of the lower edge of the ship target as the position of the target to participate in the position matching in the subsequent steps.

It should be noted that the present invention uses offline training to train the ship target classifier, and the training process does not affect the efficiency of the ship target classifier in detecting the ship target. The number of ship samples participating in the training is an important factor influencing the detection rate of the ship target classifier. The present invention selects 2000 positive samples and 6000 negative samples to participate in the training, taking the detection rate and training time into consideration. It is a preferred value rather than a fixed value.

It should be noted that the height of the ship in the image will cause the position of the ship target to shift. Therefore, the present invention selects the center point of the lower edge of the ship target in the image as the position of the ship target for matching, thereby improving the accuracy of identity recognition.

2. AIS Target Data Filtering and Location Estimation

The received AIS target data is filtered on two scales of time and space, so as to eliminate invalid AIS target data and improve the efficiency of matching and recognition. The filtering basis is as follows:

(2.1) In the terms of time, AIS data that is not updated beyond the preset time is considered as invalid data.

(2.2) In the terms of space, AIS targets that are out of the preset range are considered as invalid data.

Because the AIS data update speed is lower than the surveillance video update speed, the received AIS target position always lags behind the current target actual position. In the present invention predicting the actual position $(x_1, y_1)$ at the current moment $t_0$ according to the data including the AIS target sailing speed V, sailing direction $\theta$, position $(x_0, y_0)$, AIS data sending time $t_{-1}$, to improve the accuracy of identification. The prediction formula as follows:

$$x_1 = x_0 + \arcsin\left\{\frac{\sin\left(\frac{D}{R}\right) \times \sin\theta}{\arccos\left[\sin(y_0) \times \cos\left(\frac{D}{R}\right) + \cos(y_0) \times \sin\left(\frac{D}{R}\right) \times \cos\theta\right]}\right\} \quad (1)$$

$$y_1 = 90 - \arccos\left[\sin(y_0) \times \cos\left(\frac{D}{R}\right) + \cos(y_0) \times \sin\left(\frac{D}{R}\right) \times \cos\theta\right] \quad (2)$$

Wherein D is the sailing distance of AIS target from time $t_{-1}$ to time $t_0$, $D=V(t_0-t_1)$, R is the radius of the earth.

3. Target Position Matching

Figure 2:
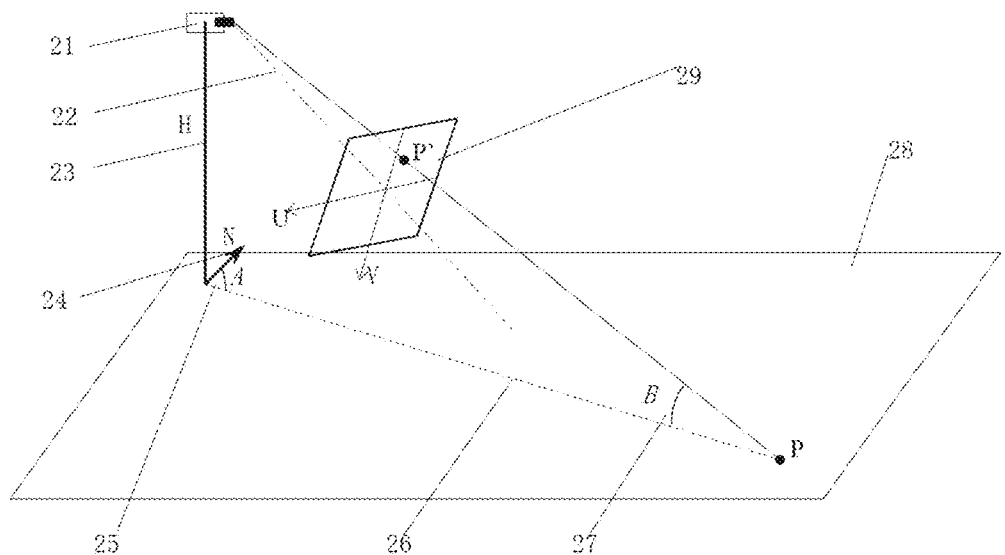
FIG. 2 is a schematic diagram of imaging of a pan tilt camera of the present invention.

FIG. 2 is a schematic diagram of imaging of a pan tilt camera of the present invention.

Reference Mark:

21 pan tilt camera; 22 camera optical axis; 23 building; 24 Geographical True North; 25 the azimuth angle of the target relative to the camera; 26 the projection line of the connection between the target and the camera on the horizontal plane; 27 the angle between the line between the target and the camera and the horizontal plane; 28 sea level; 29 camera imaging plane.

Figure 3:
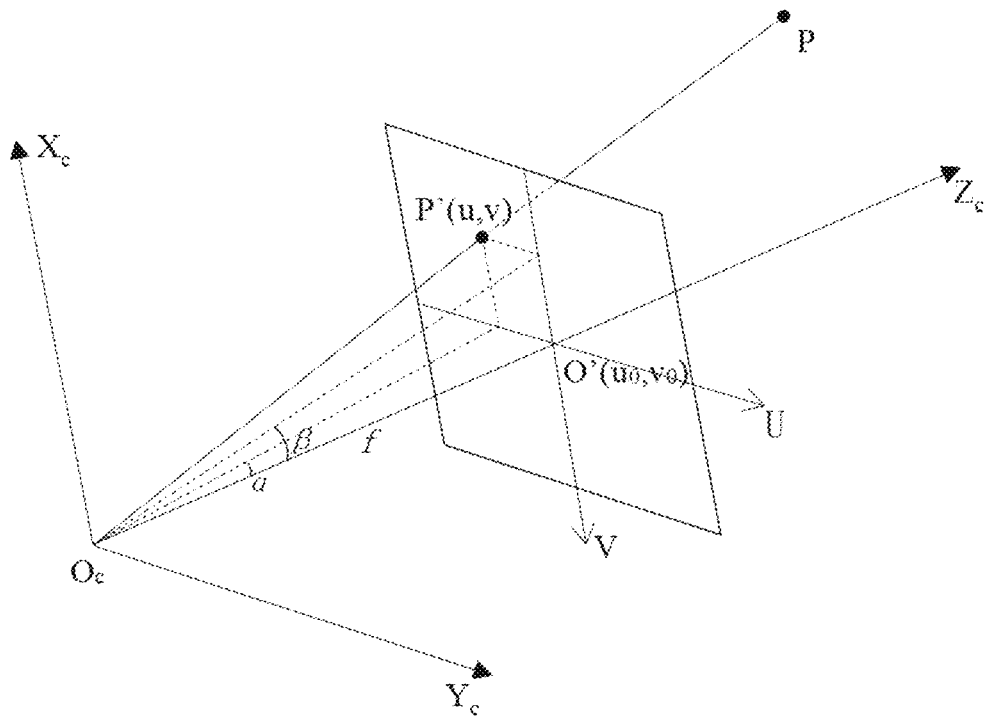
FIG. 3 is a diagram of the relationship between the image coordinate system and the camera coordinate system of the present invention.
Figure 4:
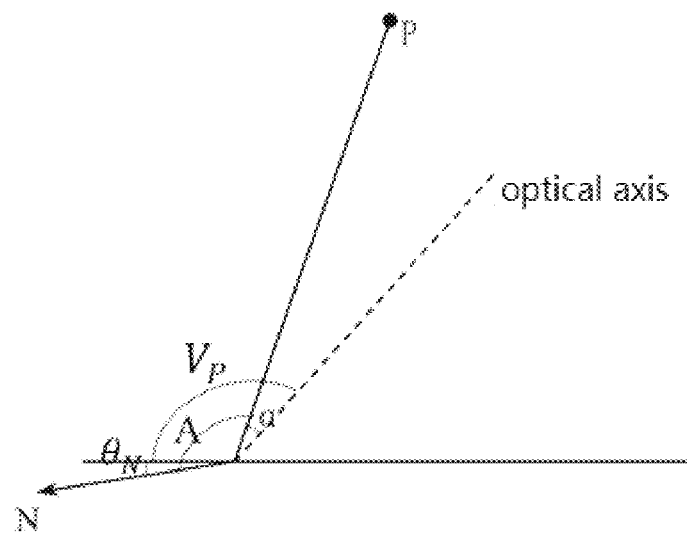
FIG. 4 is a top view of imaging of a pan tilt camera of the present invention.
Figure 5:
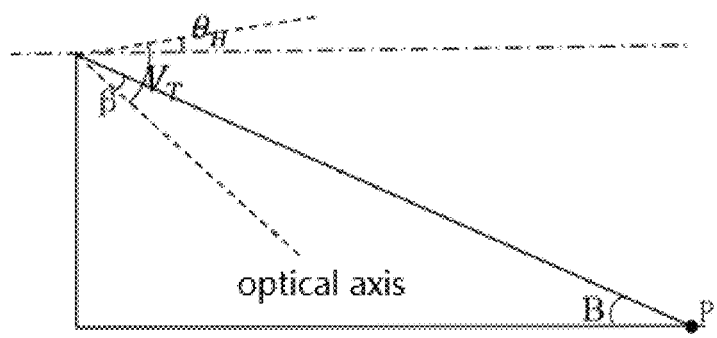
FIG. 5 a side view of imaging of a pan tilt camera of the present invention.

In order to better show the relationship between the various angles, FIG. 3 is a diagram of the relationship between the image coordinate system and the camera coordinate system of the present invention, FIG. 4 is a top view of imaging of a pan tilt camera of the present invention, FIG. 5 a side view of imaging of a pan tilt camera of the present invention, wherein each angles marked the same between the figures indicate that the angles are displayed at different angles.

It should be noted, $O_c$-$x_c y_c z_c$ is the camera coordinate system, O'-UV is the pixel coordinates system, pan tilt parameters of the pan tilt camera are expressed as $V_P$, $V_T$, $V_Z$ respectively, f is the camera focal length, a is the angle between the line between the projection point of the target on the U axis and the camera center and the optical axis, $\beta$ is the angle between the line between the target projection point on the V axis and the camera center and the optical axis, $\theta_H$ is the zero azimuth of the pan tilt camera and the horizontal plane, $\theta_N$ is the angle between the zero azimuth angle of the pan tilt camera in the horizontal direction and the true geographic north.

The position matching method proposed by the present invention includes the following steps:

Step 1: carrying out the camera installation parameter calibration, obtaining the angle $\theta_H$ between the zero azimuth angle of the pan tilt camera and the horizontal plane, and the angle between the horizontal direction and the geographic true north;

Step 2: converting the AIS target position from geographic coordinates to camera image plane coordinates;

Step 3: calculating the Euclidean distance between the position of the ship to be matched and the converted AIS target position;

Step 4: calculating the confidence of matching success and judge whether the matching is successful according to the confidence.

It should be noted that in step 1, the zero azimuth angle of the pan tilt camera indicates the parameters $V_P$, $V_T$ of the pan tilt, which are all zero-degree direction lines, the angle $\theta_H$ between the zero azimuth angle of the pan tilt camera and the horizontal plane, and the calibration method of the included angle $\theta_N$ between the horizontal direction and the geographic true north as follows:

Selecting n reference points, n is a natural number, the geographical location of the $n^{th}$ reference point is expressed as $(x_n, y_n)$, the coordinates under the image coordinate system are $(u_n, v_n)$, and the origin of the coordinates of the pixel coordinate system in the image coordinate system are $(u_0, v_0)$, the calculation formulas of $\theta_H$ and $\theta_N$ are as follows:

$$\theta_N = \frac{\sum_{n=1}^{n}\left[A_n - \arctan\frac{w(v_n - v_0)}{f_0 V_Z} - V_P\right]}{n} \quad (3)$$

$$\theta_H = \frac{\sum_{n=1}^{n}\left[B_n - \arctan\frac{h(u_n - u_0)}{f_0 V_Z} - V_T\right]}{n} \quad (4)$$

Wherein $A_n$ is the azimuth angle between the $n^{th}$ reference point and the camera, and $B_n$ is the angle between the line between the $n^{th}$ reference point and the camera and the horizontal plane, n is an integer greater than 2, and the preferred value is 6.

It should be noted that in step 2 transforming the location of the AIS target from geographic coordinates to camera image coordinates, and the transformed coordinates (u, v) are calculated as follows:

$$u = u_0 + \frac{f_0 V_Z \tan(A - V_P - \theta_N)}{w} \quad (5)$$

$$v = v_0 + \frac{f_0 V_Z \tan(B - V_T - \theta_H)}{h} \quad (6)$$

Wherein A is azimuth angle between AIS target and the camera, B is angle between connecting line of AIS target and the camera and horizontal plane, $(u_0, v_0)$ are coordinates of origin of pixel coordinate system in image coordinate system, $V_P$, $V_T$, $V_Z$ are current pan-tilt parameters, $f_0$ is basic focal length of the pan-tilt camera, w is unit pixel width and is h is unit pixel height.

It should be noted that in step 3 calculating the Euclidean distance D between the position of the ship to be matched and the transformed target position of AIS, the formula is as follows:

$$D = \sqrt{(u_1 - u)^2 + (v_1 - v)^2} \quad (7)$$

Wherein the position of the ship to be matched is $(u_1, v_1)$, and the transformed target position of AIS is (u, v).

It should be noted that in step 4 calculating the confidence level C of matching success, the formula is as follows:

$$C = \frac{T - D}{T} \times 100\% \quad (8)$$

Wherein D is the Euclidean distance between the ship to be matched and the transformed target position of AIS, T is the preset threshold, the threshold value T is preferably 100 pixels.

The matching rules are: when D is greater than the preset threshold T, the target matching is judged failure directly; when D is less than the preset threshold T, the AIS target with the maximum confidence C of matching success is selected as the successful matching target.

4. Recognized Ship Library Construction

In order to avoid repetitive execution of the matching process for the ship target and increase the running speed, the present invention extracts texture, contour, color and position characteristics of the successfully matched ship target to construct a target template, and store it in the identified ship database together with the matching information. When a new target is generated, firstly compare it with the identified ship library, if it is an identified ship then filter it, and only perform the matching process when the target is new.

In summary, the present invention can integrate AIS and video data through technical means such as image processing and information processing, and quickly and accurately extract and recognize ship targets in surveillance videos, which can effectively reduce human costs and has broad application prospects in ship transportation, port management and other fields. The specific advantages are as follows:

(1) The ship target in the video is detected by the ship target classifier, which reduces the rate of missed detection and false detection.

(2) By filtering AIS data on two scales of time and space, the amount of calculation is reduced and the running speed is improved.

(3) Predict the AIS target position by linear extrapolation, which solves the shortcoming of slow update of AIS data and improves the accuracy of identification.

(4) Different from the calibration camera model, the present invention realizes the conversion of geographic coordinates and image coordinates through real-time parameters of the pan tilt and camera installation parameters, allowing movement of the pan tilt and zooming of the field of view during the recognition process.

(5) By constructing a library of identified ships, the ship target avoids repeating the matching process and improves the operation speed.

While the present invention has been disclosed as above in preferred embodiments, it is not intended to limit the invention. Any person skilled in the art may make various improvement and modifications within the spirit and scope of the invention. Therefore, the scope of protection of the invention shall be subject to that defined in the claims.

What is claimed is:

1. A ship identity recognition method based on the fusion of AIS data and video data, wherein comprising the steps as follows:
   step 1: collecting a ship sample to train a ship target classifier;
   step 2: performing, using the ship target classifier, ship target detection on a video frame collected by a gimbal camera;
   step 3: performing a comparison with a recognized ship library to filter a recognized ship, if the target is new, continue with the next steps;
   step 4: acquiring AIS data and filtering same across time and spatial scales;
   step 5: predicting the current position of an AIS target using a linear extrapolation method;
   step 6: converting the current position to an image coordinate system;
   step 7: performing position matching between the new target in step 3 and the converted AIS target in step 4, and the fail matched new target waiting for the next matching process;
   step 8: performing feature extraction on the successfully matched target and storing the extracted feature, together with ship identity information, into the recognized ship library, as the filtering standard of step 3;
   wherein the step 5 comprises:
   predicting the actual position $(x_1, y_1)$ at the current moment $t_0$ according to the received AIS data, the AIS target data including sailing speed V, sailing direction $\theta$, position $(x_0, y_0)$, AIS data sending time $t_{-1}$, the prediction formula as follows:

$$x_1 = x_0 + \arcsin\left\{\frac{\sin\left(\frac{D}{R}\right) \times \sin\theta}{\arccos\left[\sin(y_0) \times \cos\left(\frac{D}{R}\right) + \cos(y_0) \times \sin\left(\frac{D}{R}\right) \times \cos\theta\right]}\right\}$$

$$y_1 = 90 - \arccos\left[\sin(y_0) \times \cos\left(\frac{D}{R}\right) + \cos(y_0) \times \sin\left(\frac{D}{R}\right) \times \cos\theta\right]$$

wherein D is the sailing distance of AIS target from time $t_{-1}$ to time $t_0$, $D=V(t_0-t_{-1})$, R is the radius of the earth.

2. The ship identity recognition method based on the fusion of AIS data and video data according to claim 1, the specific process of step 1 is as follows:
   In the monitoring scene, collecting a number of ship image samples with different types and attitudes and a number of image samples without ship as positive and negative samples respectively, and training the ship target classifier based on Haar feature by offline training.

3. The ship identity recognition method based on the fusion of AIS data and video data according to claim 1, the specific process of step 2 is as follows:
   detecting the ship target from the video frames collected by the pan-tilt camera by the trained ship target classifier, extracting the center point of the bottom edge of the ship target as the position of the target to participate in the position matching in the following steps.

4. The ship identity recognition method based on the fusion of AIS data and video data according to claim 1, the step 4 filters the received AIS target data as follows:
   in the terms of time, AIS data that is not updated beyond the preset time is considered as invalid data;
   in the terms of space, AIS targets that are out of the preset range are considered as invalid data.

5. The ship identity recognition method based on the fusion of AIS data and video data according to claim 4, wherein the preset time is 3 minutes, the preset range is ±15° of the camera field of view.

6. The ship identity recognition method based on the fusion of AIS data and video data according to claim 1, wherein the step 6 including:
   step 6.1: calibrating the camera parameters, obtaining the angle between the zero azimuth angle and the horizontal plane, and the angle between the horizontal direction and the geographical true north of the pan-tilt camera, the specific method is as follows:
   selecting n reference points, n is a natural number, the geographical location of the $n^{th}$ reference point is expressed as $(x_n, y_n)$, the coordinates under the image coordinate system are $(u_n, v_n)$, and the origin of the coordinates of the pixel coordinate system in the image coordinate system are $(u_0, v_0)$, the calculation formulas of $\theta_H$ and $\theta_N$ are as follows:

$$\theta_N = \frac{\sum_{n=1}^{n}\left[A_n - \arctan\frac{w(v_n - v_0)}{f_0 V_Z} - V_P\right]}{n}$$

$$\theta_H = \frac{\sum_{n=1}^{n}\left[B_n - \arctan\frac{h(u_n - u_0)}{f_0 V_Z} - V_T\right]}{n}$$

wherein $A_n$ is the azimuth angle between the $n^{th}$ reference point and the camera, and $B_n$ is the angle between the line between the $n^{th}$ reference point and the camera and the horizontal plane;

step 6.2: transforming the location of the AIS target from geographic coordinates to camera image coordinates, and the transformed coordinates (u, v) are calculated as follows:

$$u = u_0 + \frac{f_0 V_Z \tan(A - V_P - \theta_N)}{w}$$

$$v = v_0 + \frac{f_0 V_Z \tan(B - V_T - \theta_H)}{h}$$

wherein A is azimuth angle between AIS target and the camera, B is angle between connecting line of AIS target and the camera and horizontal plane, $(u_0, v_0)$ are coordinates of origin of pixel coordinate system in image coordinate system, $V_P, V_T, V_Z$ are current pan-tilt parameters, $f_0$ is basic focal length of the pan-tilt camera, w is unit pixel width and is h is unit pixel height.

7. The ship identity recognition method based on the fusion of AIS data and video data according to claim 1, wherein implementing step 4, step 5 and step 6 in the whole identification process, continuously receiving ship AIS data within the receiving scope and processing the received AIS data.

8. The ship identity recognition method based on the fusion of AIS data and video data according to claim 1, wherein the specific process of step 7 is as follows:
   calculating the Euclidean distance D between the position of the ship to be matched and the transformed target position of AIS, the formula is as follows:

$$D = \sqrt{(u_1-u)^2 + (v_1-v)^2}$$

the position of the ship to be matched is $(u_1, v_1)$, and the transformed target position of AIS is (u, v);
calculating the confidence level C of matching success, the formula is as follows:

$$C = \frac{T - D}{T} \times 100\%$$

wherein D is the Euclidean distance between the ship to be matched and the transformed target position of AIS, T is the preset threshold;
the matching rules are: when D is greater than the preset threshold T, the target matching is judged failure directly; when D is less than the preset threshold T, the AIS target with the maximum confidence C of matching success is selected as the successful matching target.

9. The ship identity recognition method based on the fusion of AIS data and video data according to claim 1, wherein the specific process of step 3 and step 8 are as follows:
   extracting the texture, contour, color and position features of the matched ship target to construct the target template, storing in the identified ship database together with the matching information; when a new target is generated, firstly comparing it with the identified ship database, if it is a recognized ship, it will be filtered, performing the matching process only when the ship is confirmed as new.

10. A ship identity recognition method based on the fusion of AIS data and video data, wherein comprising the steps as follows:

step 1: collecting a ship sample to train a ship target classifier;

step 2: performing, using the ship target classifier, ship target detection on a video frame collected by a gimbal camera;

step 3: performing a comparison with a recognized ship library to filter a recognized ship, if the target is new, continue with the next steps;

step 4: acquiring AIS data and filtering same across time and spatial scales;

step 5: predicting the current position of an AIS target using a linear extrapolation method;

step 6: converting the current position to an image coordinate system;

step 7: performing position matching between the new target in step 3 and the converted AIS target in step 4, and the fail matched new target waiting for the next matching process;

step 8: performing feature extraction on the successfully matched target and storing the extracted feature, together with ship identity information, into the recognized ship library, as the filtering standard of step 3;

wherein the step 6 including:

step 6.1: calibrating the camera parameters, obtaining the angle between the zero azimuth angle and the horizontal plane, and the angle between the horizontal direction and the geographical true north of the pan-tilt camera, the specific method is as follows:

selecting n reference points, n is a natural number, the geographical location of the $n^{th}$ reference point is expressed as $(x_n, y_n)$, the coordinates under the image coordinate system are $(u_n, v_n)$, and the origin of the coordinates of the pixel coordinate system in the image coordinate system are $(u_0, v_0)$, the calculation formulas of $\theta_H$ and $\theta_N$ are as follows:

$$\theta_N = \frac{\sum_{n=1}^{n}\left[A_n - \arctan\frac{w(v_n - v_0)}{f_0 V_Z} - V_P\right]}{n}$$

$$\theta_H = \frac{\sum_{n=1}^{n}\left[B_n - \arctan\frac{h(u_n - u_0)}{f_0 V_Z} - V_T\right]}{n}$$

wherein $A_n$ is the azimuth angle between the $n^{th}$ reference point and the camera, and $B_n$ is the angle between the line between the $n^{th}$ reference point and the camera and the horizontal plane;

step 6.2: transforming the location of the AIS target from geographic coordinates to camera image coordinates, and the transformed coordinates (u, v) are calculated as follows:

$$u = u_0 + \frac{f_0 V_Z \tan(A - V_P - \theta_N)}{w}$$

$$v = v_0 + \frac{f_0 V_Z \tan(B - V_T - \theta_H)}{h}$$

wherein A is azimuth angle between AIS target and the camera, B is angle between connecting line of AIS target and the camera and horizontal plane, $(u_0, v_0)$ are coordinates of origin of pixel coordinate system in image coordinate system, $V_P$, $V_T$, $V_Z$ are current pan-tilt parameters, $f_0$ is basic focal length of the pan-tilt camera, w is unit pixel width and is h is unit pixel height.

11. The ship identity recognition method based on the fusion of AIS data and video data according to claim 10, the specific process of step 1 is as follows:

In the monitoring scene, collecting a number of ship image samples with different types and attitudes and a number of image samples without ship as positive and negative samples respectively, and training the ship target classifier based on Haar feature by offline training.

12. The ship identity recognition method based on the fusion of AIS data and video data according to claim 10, the specific process of step 2 is as follows:

detecting the ship target from the video frames collected by the pan-tilt camera by the trained ship target classifier, extracting the center point of the bottom edge of the ship target as the position of the target to participate in the position matching in the following steps.

13. The ship identity recognition method based on the fusion of AIS data and video data according to claim 10, the step 4 filters the received AIS target data as follows:

in the terms of time, AIS data that is not updated beyond the preset time is considered as invalid data;

in the terms of space, AIS targets that are out of the preset range are considered as invalid data.

14. The ship identity recognition method based on the fusion of AIS data and video data according to claim 13, wherein the preset time is 3 minutes, the preset range is ±15° of the camera field of view.

15. The ship identity recognition method based on the fusion of AIS data and video data according to claim 10, wherein implementing step 4, step 5 and step 6 in the whole identification process, continuously receiving ship AIS data within the receiving scope and processing the received AIS data.

16. The ship identity recognition method based on the fusion of AIS data and video data according to claim 10, wherein the specific process of step 7 is as follows:

calculating the Euclidean distance D between the position of the ship to be matched and the transformed target position of AIS, the formula is as follows:

$$D = \sqrt{(u_1 - u)^2 + (v_1 - v)^2}$$

the position of the ship to be matched is $(u_1, v_1)$, and the transformed target position of AIS is (u, v);

calculating the confidence level C of matching success, the formula is as follows:

$$C = \frac{T - D}{T} \times 100\%$$

wherein D is the Euclidean distance between the ship to be matched and the transformed target position of AIS, T is the preset threshold;

the matching rules are: when D is greater than the preset threshold T, the target matching is judged failure directly; when D is less than the preset threshold T, the AIS target with the maximum confidence C of matching success is selected as the successful matching target.

17. The ship identity recognition method based on the fusion of AIS data and video data according to claim 10, wherein the specific process of step 3 and step 8 are as follows:

extracting the texture, contour, color and position features of the matched ship target to construct the target template, storing in the identified ship database together with the matching information; when a new target is generated, firstly comparing it with the identified ship database, if it is a recognized ship, it will be filtered, performing the matching process only when the ship is confirmed as new.

\* \* \* \* \*